June 10, 1930.  H. F. TOWNER  1,762,844
DISK CULTIVATOR
Filed June 1, 1927
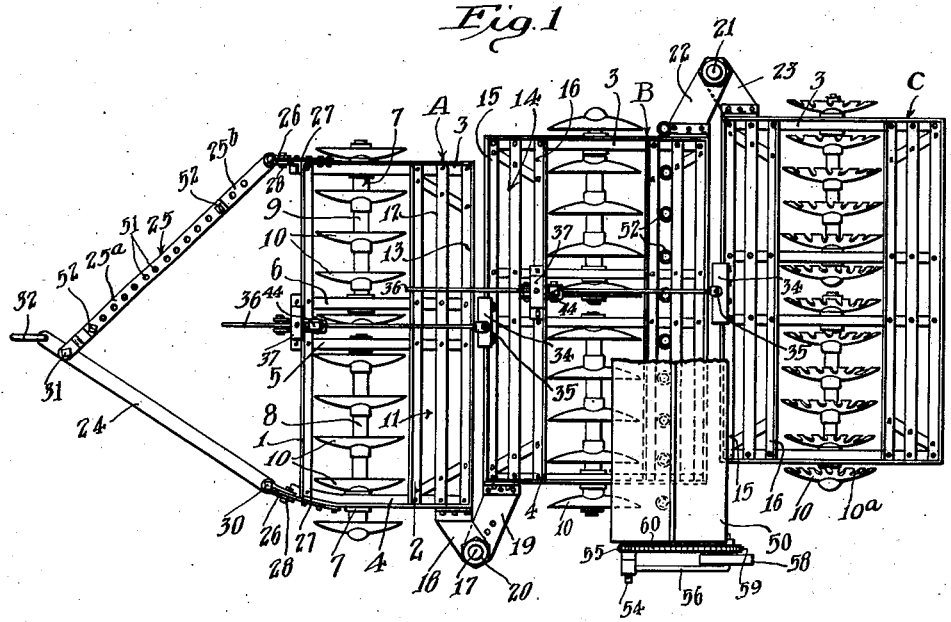
Inventor
Heber F. Towner
By Lyon & Lyon
Attorneys Patented June 10, 1930

1,762,844

UNITED STATES PATENT OFFICE

HEBER F. TOWNER, OF SANTA ANA, CALIFORNIA; P. G. BEISSEL, EXECUTOR OF SAID HEBER F. TOWNER, DECEASED, ASSIGNOR TO B. V. CURRY, TRUSTEE

DISK CULTIVATOR

Application filed June 1, 1927. Serial No. 195,646.

This invention relates to disk harrows, and is more particularly related to a disk harrow including a multiplicity of gangs of disks mounted in tandem relation.

In cultivating the ground with disk harrows, it is common practice to employ a disk harrow including a pair of four gangs of disks, which are connected in tandem relation or in pairs connected in tandem relation, to prepare the soil for the final mulching of the soil before the same is prepared for seeding or the like.

In accordance with this invention, a disk harrow of the type disclosed in my copending application, Serial No. 119,362, including a pair of gangs of disks connected together in tandem relation at a pivotal connection at one end of the pair of gangs and at a point substantially midway between the gangs and beyond the ends thereof, is connected to a third gang of disks, the disks of which are preferably spaced closer together in the gang than the disks of the two forward gangs at a pivotal draft connection located substantially midway between the axes of gangs of disks of the intermediate and rear gangs, and beyond the ends of the disks thereof, so that the entire disk harrow assembly will automatically assume the proper working position in the ground, as is regulated by the adjustable draft connection secured to the advanced or front gang of disks, the two forward gangs of disks being for the purpose of preliminarily preparing the soil or cultivating the same, and the rear gang being for the purpose of finally mulching the soil so that the entire cultivation of the soil is had by running the disk harrow embodying this invention over the same once.

It is therefore an object of this invention to provide a disk cultivator including a plurality of gangs of disks mounted in tandem relation, and operatively connected together at single pivot and draft connections, part of which gangs are for the purpose of preliminarily preparing the soil and the other of which gangs are for the purpose of finally mulching the soil to prepare the same for seeding or the like.

Another object of this invention is to provide an implement adapted to disk, seed and harrow and turn the seed under the soil in a single operation of the implement over the soil.

Other objects and advantages of this invention it is believed will be apparent from the following detailed description of a preferred embodiment thereof, as illustrated in the accompanying drawings:

In the drawings:

Figure 1 is a top plan view of a disk cultivator embodying this invention, illustrating a seed distributor in plan view and partly broken away as adapted thereto.

Figure 2 is a side elevation thereof.

Figure 3 is a top plan view on a reduced scale of a disk cultivator embodying this invention, illustrating the same as attached to a tractor in offset position.

Figure 4 is an enlarged fragmental sectional detail view of the pivot stay-bar yoke and release means.

Figure 5 is a fragmental sectional detail view of a form of seed distributor drive.

In the preferred embodiment of this invention illustrated in the accompanying drawings, A, B and C illustrate gangs of disks which are connected together in tandem relation. The disk gangs A, B and C are preferably constructed of forward and rearward frame members 1 and 2, which are connected together at their ends by transversely extending frame members 3 and 4, and at their intermediate portions by frame members 5 and 6. Secured in bearings 7 secured to the transversely extending frame members 3, 4, 5 and 6 of each gang are disk carrying shafts 8 and 9, upon which concavo-convex disks 10 are secured in any suitable or desirable manner, as is well understood in the art. Formed at the rear of each gang A, B and C are weight carrying boxes 11 in which weights are adapted to be positioned for holding the disks 10 down into operative position in the ground, the amount of weight being varied, depending upon the depth to which it is desired to force the disks 10 in any particular soil. The weight boxes 11 are preferably composed of transversely extending frame members 12 and 13, which are connected at their ends to extensions of the transversely extending frame members 3 and 4, and at their intermediate portions to the transversely extending frame members 5 and 6. The rear member 13 of each of the weight boxes 11 is preferably formed of a channel iron. Provided at the front of the gangs B and C are weight boxes 14 which are likewise constructed of angle irons 15 and bars 16, which are secured at their ends to the end frame members 3 and 4 and at their intermediate portions to the intermediate frame members 5 and 6.

Means are provided for connecting each of the gangs A, B and C together so that the gang C is pulled forward by the gange B, and the gang B is pulled forward by the gang A, the draft connection between the gangs A, B and C being such that as a certain working angle is set in the gang A, a like or corresponding working angle will be set automatically in the gang B, and a similar working angle will automatically be assumed by the gang C. In order to accomplish this, the gang A is connected to the gang B at a draft pivot 17, which passes through a bifurcated bracket 18 secured to the frame member 4 of the gang A and through a plate 19 secured to the frame member 4 of the gang B, the plate 19 being passed between the plates of the bifurcated bracket 18 so that a hinge is provided between the gangs A and B, the pivot point of which, provided by the pivot 17, is substantially midway between the axes of the disks 10 of the gangs A and B and is at or beyond the end disks 10 of the gangs A and B. The pivot 17 is secured in position by means of nuts 20 which are screw-threaded to the pin 17 above and below the bifurcated bracket 18.

The gang B is connected to the gang C at a single pivot point 21, which is mounted at the opposite end of the gang B from the pivot pin 17 and is likewise passed through a bifurcated bracket 22 secured to the end frame member 3 of the gang B and the plate 23 secured to the end frame member 3 of the gang C. The pin 21 is likewise located substantially midway between the axes of the disks 10 of the gangs B and C and at or beyond the end disks 10 of the gangs B and C. Means are provided for securing the forward gang of disks A to a tractor or like source of draft power, which means preferably comprise an "A" hitch, including a bar 24 and an adjustable bar 25. The bars 24 and 25 are secured by means of clevises 26 to plates 27 secured to the frame members 3 and 4, respectively. The clevises 26 are adjustably secured to the plates 27 by bolts 28 which are adapted to be passed through any one of a series of holes 29 formed in the plates 27. The clevises are secured at their opposite ends by means of bolts 30 to the ends of the bars 24 and 25, respectively. The bar 25 comprises two sections 25ª and 25ᵇ, along the length of which there are formed a plurality of equally spaced holes 51 through which bolts 52 are adapted to be passed so as to permit an easy adjustment of the length of the bar 25. The bar 25 is pivotally secured by the bolt 31 to the bar 24. A draft clevis 32 is secured to the end of the bar 24 and is adapted to be secured to the draft bar of a tractor 33.

The gangs A and B have their disks 10 equally spaced, and the gang B is mounted in offset relation with respect to the gang A so that the disks 10 of the gang B cut furrows intermediate the furrows cut by the disks 10 of the gang A. The disks 10 of the gangs A and B are employed for preliminarily preparing the soil. The disks 10 of the gang C are preferably of the cut-out type, as illustrated at 10ª, and are mounted on the shafts 8 and 9 of the gang C preferably in closer spaced relation than are the disks 10 of the gangs A and B, and are employed for the purpose of finally preparing the soil for seeding or the like, and are what may be termed mulching disks.

The hinge connections provided by the bifurcated bracket 18 and the plate 19 are preferably so constructed as to maintain the respective ends of the gangs of disks in position to insure substantially equal penetration of the same during the working of the disk harrow. In order to accomplish this result, the bifurcated brackets 18 and 22 are secured to the end members 4 and 3 of the gangs A and B, respectively, in inclined position so that the concave end of the gangs B and C are normally urged up from the soil and the convex end of the gangs A and B are normally urged down into the soil by the draft hinge connection provided at the pins 17 and 21, respectively. This manner of mounting the bifurcated brackets 18 and 22 overcomes the normal tendency of disks mounted in a gang to dig in at the concave ends of the gangs and ride out on the convex ends. In order to insure correct working position of all of the gangs A, B and C, and to provide a starting point from which the compensating arrangement of bifurcated brackets 18 and 22 may operate to maintain the gangs B and C in proper working relation to the ground, the draft bars 24 and 25, as heretofore described, are secured to the forward gang A in adjustable relation at the plates 27, so that the bar 24 may be secured to the gang A at a point below that at which the bar 25 is secured to the opposite or concave end of the gang A, thus tending to maintain the gang A in position to insure substantially equal penetration of the disks 10. The gang A being set by this means of securing the same to the draft bar, acts as a starting point from which the gangs B and C may be maintained in position through the positioning of the bifurcated brackets 18 and 22 to maintain substantially equal penetration of the disks 10 of the gangs B and C.

Means are provided for maintaining equal working angles in the gangs A and B, and a similar working angle in the gang C when the disk harrow is drawn over uneven ground or down or up hills or the like, and for providing a means for locking the gangs A, B and C so that the disks travel in a straight line when it is desired to pull the disk cultivator over the ground or roadway without having the disks 10 penetrate into the surface, which means are preferably of the following construction:

The means provided for maintaining the gangs A and B in a desired working angle or with their disks 10 working in a straight line is of substantially the same construction as the means provided for maintaining the gangs B and C in the same relations, so that only one of these means will be described. Secured to the forward frame member 15 is a vertically extending bracket 34, to the upper end of which is pivotally secured at a pin 35 a stay-bar 36. The stay-bar 36 extends forward from the bracket 34 and passes through a bifurcated bracket 37 within which a bifurcated pivot yoke 38 is mounted by pins 39 and 40. The lower surface of the bar 36 is provided with a plurality of notches 41, any one of which is adapted to fit over a pin 42 mounted within the bifurcated yoke 38. Means are provided for holding the bar 36 down in position so that the pin 42 will be engaged in one of the notches 41, which means preferably comprise a bifurcated bracket 43 which is pivotally secured to the bifurcated yoke 38 and carries at its outer end a roller 44 adapted to roll upon the upper surface of the bar 36. Spring means 45 are provided for yieldably urging the bracket 43 downward so as to yieldably urge the bar 36 down into position on the pin 42. Means are provided for releasing the bar 36 from engagement with the pin 42 when it is desired to set an angle in the gangs A and B or B and C, which means preferably comprise a second bifurcated bracket 46 which is pivotally secured to the bifurcated yoke 38 below the bar 36, and within which bifurcated bracket 46 a roller 47 is mounted, adapted to engage the under surface of the bar 36. A right angle lever 48 is provided as an extension to the bifurcated bracket 46, and to the end of this lever there is secured a flexible rope or cable 49 which extends forwardly of the disk harrow to the operating position of the tractor 33 so that by pulling upon the rope 49, the bifurcated bracket 46 is rotated on its pivotal support within the bifurcated yoke 38 to cause the roller 47 to engage the under surface of the bar 36 and lift the same vertically to disengage the pin 42 from within the recess 41. By then backing or pulling forward the disk cultivator, the proper or desired working angle may be set in the gangs A and B, and B and C.

In Fig. 3 is illustrated the manner of securing the draft bars 24 and 25 to the draft bar of the tractor 33 so that the entire disk cultivator will be drawn to one side of or in an offset position in relation to the tractor 33, so as to permit the cultivator to be drawn under trees or close to cultivation or other points without necessitating the driving of the tractor under the trees or close to the cultivation or the like.

In order to provide an implement of the class described which is adapted to be employed for disking and seeding the soil in a single operation of the implement over the soil, the preferred construction provided is described as follows:

A seed box 50 is mounted on the frame of the rear gang B in any suitable or desired manner, as illustrated at 51. Mounted in the seed box 50 is a distributing roller (not shown, but well understood in the art) by means of which the seeds within the box 50 are distributed and discharged by the said roller through feed spouts 52 which discharge the seeds into the soil to the rear of the disks 10 of the rear gang B.

Means are provided for driving the seed distributor or the distributing roller or mechanism thereof which means may be of any desired construction and are herein illustrated as including a bracket 53 secured to the seed box 50 and supporting in bearings a shaft 54 from which the distributing mechanism is driven in any suitable or desirable manner. Secured to the shaft 54 is a sprocket 55, rotatably journaled on the shaft 54 is an arm 56. The arm 56 carries at its opposite end in a bearing a shaft 57 upon which a ground wheel 58 and a sprocket 59 are secured. Trained over the sprockets 55 and 59 is a chain 60 by means of which the shaft 54 is driven as the wheel 58 is drawn over the ground. The wheel 58 is in this manner supported so as to permit the same to move vertically in accordance with ground irregularities and still drive the distributing mechanism.

Having fully described my invention, it is to be understood that I do not wish to be limited to the details herein set forth, which may obviously be varied within the scope of my invention, as defined by the appended claims.

I claim:—

1. In a disk cultivator, the combination of a forward gang of disks, an intermediate gang of disks, means pivotally connecting the gangs of disks at one end, a rear gang of disks, and means connecting the rear gang of disks to the intermediate gang of disks.

2. In a disk cultivator, the combination of a forward gang of disks, an intermediate gang of disks, the forward and intermediate gangs of disks including a plurality of concavo-convex disks mounted in the respective gangs in substantially equal spaced relation, means pivotally connecting the gangs of disks at one end, a rear gang of disks, the disks of the rear gang being mounted closer together than the disks of the forward and intermediate gangs, and means connecting the rear gang of disks to the intermediate gang of disks.

3. In a disk cultivator, the combination of a forward gang of disks, an intermediate gang of disks, means for connecting the intermediate gang of disks in tandem relation to the forward gang of disks at one end of the gangs, a rear gang of disks, and means for connecting the rear gang of disks to the intermediate gang of disks at the opposite end of the intermediate gang of disks.

4. In a disk cultivator, the combination of a forward gang of disks, an intermediate gang of disks, means pivotally connecting the gangs of disks at one end in tandem relation, a rear gang of disks, and means pivotally connecting the rear gang of disks to the intermediate gang of disks at the ends of the rear and intermediate gangs of disks at the opposite end of the intermediate gang of disks.

5. In a triple tandem disk cultivator, the combination of a forward gang of disks, an intermediate gang of disks, a rear gang of disks, means connecting the forward gang of disks to the intermediate gang of disks at one end, means connecting the intermediate gang of disks to the rear gang of disks at the opposite end, draft means secured to the forward gang of disks, and stay means pivotally connecting the intermediate gang of disks with the forward gang of disks and connecting the rear gang of disks with the intermediate gang of disks.

6. In an implement of the class described, the combination of a forward gang of disks, a second gang of disks, means for connecting the said gangs of disks in tandem relation to permit the gangs to swing apart at one end, a third gang of disks, and means for connecting the third gang of disks to the second gang of disks in tandem relation to permit the second and third gangs of disks to swing apart to a working position at their ends opposed to the ends at which the forward and second gangs are permitted to swing apart.

7. In an implement of the class described, the combination of a forward gang of disks, a second gang of disks, means for connecting said gangs together in tandem relation to permit said gangs to swing apart at one end, a third gang of disks, means for connecting the third gang of disks to the second gang of disks to permit the second and third gang of disks to swing apart to a working position at their ends opposed to the ends at which the forward and second gangs of disks are permitted to swing apart, and holding means for holding the gangs in working position.

8. In an implement of the class described, the combination of a forward gang of disks, a second gang of disks, means for connecting said gangs together to permit the gangs to swing apart at one end, a third gang of disks, means connecting the third gang of disks to the second gang of disks in tandem relation to permit the second and third gangs of disks to swing apart to a working position at their ends opposed to the ends at which the forward and second gangs are permitted to swing apart, draft devices connected with the forward gang for connecting the implement with a draft means, and means for adjusting the draft devices to vary the offset position of the draft means in relation to the implement.

9. In an implement of the class described, the combination of a forward gang of disks, a second gang of disks, means for connecting said gangs together to permit the gangs to swing apart at one end, a third gang of disks, means connecting the third gang of disks to the second gang of disks in tandem relation to permit the second and third gangs of disks to swing apart to a working position at their ends opposed to the ends at which the forward and second gangs are permitted to swing apart, draft devices connected with the forward gang for connecting the implement with a draft means, means for adjusting the draft devices to vary the offset position of the draft means in relation to the implement, and means for holding the gangs in working position.

Signed at Los Angeles, California, this 26 day of May 1927.

HEBER F. TOWNER.